(12) United States Patent
Hauser et al.

(10) Patent No.: US 10,829,150 B1
(45) Date of Patent: *Nov. 10, 2020

(54) ZERO TURN RADIUS VEHICLE WITH SINGLE STEERED WHEEL

(71) Applicant: Hydro-Gear Limited Partnership, Sullivan, IL (US)

(72) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,470

(22) Filed: Oct. 7, 2019

Related U.S. Application Data

(63) Continuation of application No. 15/670,646, filed on Aug. 7, 2017, now Pat. No. 10,435,069, which is a continuation of application No. 14/732,388, filed on Jun. 5, 2015, now Pat. No. 9,725,115.

(60) Provisional application No. 62/009,029, filed on Jun. 6, 2014.

(51) Int. Cl.
| | |
|---|---|
| *B62D 11/04* | (2006.01) |
| *B62D 11/00* | (2006.01) |
| *B62D 5/04* | (2006.01) |
| *B62D 11/24* | (2006.01) |
| *A01D 34/64* | (2006.01) |
| *B62D 1/12* | (2006.01) |
| *A01D 34/00* | (2006.01) |

(52) U.S. Cl.
CPC ............ *B62D 11/04* (2013.01); *A01D 34/006* (2013.01); *A01D 34/64* (2013.01); *B62D 1/12* (2013.01); *B62D 5/0457* (2013.01); *B62D 11/003* (2013.01); *B62D 11/24* (2013.01)

(58) Field of Classification Search
CPC ........ B62D 11/04; B62D 1/12; B62D 5/0457; B62D 11/003; B62D 11/24; A01D 34/006; A01D 34/64
See application file for complete search history.

(56) References Cited

U.S. PATENT DOCUMENTS

| | | | |
|---|---|---|---|
| 7,992,659 B2 | 8/2011 | Schaedler et al. | |
| 8,544,570 B2 * | 10/2013 | Ishii | A01D 34/64 180/6.5 |
| 9,725,115 B1 * | 8/2017 | Hauser | B62D 11/04 |

(Continued)

*Primary Examiner* — Kevin Hurley
*Assistant Examiner* — Marlon A Arce
(74) *Attorney, Agent, or Firm* — Neal, Gerber & Eisenberg LLP

(57) ABSTRACT

A zero turn radius vehicle with a single steered wheel may include a pair of power transfer mechanisms driving a pair of wheels, an operator control mechanism for controlling the steering, speed and direction of the vehicle and a controller in communication with the control mechanism. A steerable wheel is located adjacent the front of the vehicle frame, on a first side of the vehicle frame and an electric actuator is connected to the controller for steering the front steerable wheel. A second, non-steerable front caster wheel is located on a second side of the vehicle frame. A damper is connected to the non-steered wheel to dampen rotation of the non-steered wheel about a non-steered wheel pivot axis The controller controls the pair of power transfer mechanisms and the electric actuator based on operator input.

17 Claims, 5 Drawing Sheets

(56) References Cited

U.S. PATENT DOCUMENTS

| | | | |
|---|---|---|---|
| 10,058,031 B1 * | 8/2018 | Brown | B60K 17/356 |
| 10,392,007 B1 * | 8/2019 | Brown | B62D 11/12 |
| 2017/0120922 A1 | 5/2017 | Schaedler et al. | |

* cited by examiner

ZERO TURN RADIUS VEHICLE WITH SINGLE STEERED WHEEL

CROSS-REFERENCE

This application is a continuation of U.S. Non-Provisional application Ser. No. 15/670,646, filed on Aug. 7, 2017, which is a continuation of U.S. Non-Provisional application Ser. No. 14/732,388, now U.S. Pat. No. 9,725,115, filed on Jun. 5, 2015, which claims the benefit of U.S. Provisional App. No. 62/009,029, filed on Jun. 6, 2014, and the disclosures of these prior applications are incorporated herein by reference in their entirety.

BACKGROUND OF THE INVENTION

This invention relates to zero turn radius vehicles such as utility vehicles including lawn mowers having driven rear wheels.

SUMMARY OF THE INVENTION

A utility vehicle such as a lawn mower or the like having zero turn capability and a single steered front wheel is disclosed herein. In an embodiment, a vehicle comprises a pair of power transfer mechanisms disposed on a vehicle frame, the vehicle frame having a front and a rear, an operator control mechanism for controlling the steering, speed and direction of the vehicle, and a controller in communication with the operator control mechanism. The vehicle further comprises a pair of driven rear wheels located adjacent the rear of the vehicle frame, each rear wheel engaged to and driven by one of the power transfer mechanisms, a first steerable wheel disposed adjacent the front of the vehicle frame, on a first side of the vehicle frame, an electric actuator connected to the controller and providing a steering force for steering the first steerable wheel, and a second non-steerable caster wheel located adjacent the front of the vehicle frame, on a second side of the vehicle frame opposite the first side. The controller controls the pair of power transfer mechanisms and the electric actuator based on operator input to the operator control mechanism.

In a further embodiment, the vehicle comprises a pair of transaxles disposed on a vehicle frame. An operator control mechanism for controlling steering, speed and direction of the vehicle, and a controller in communication with the operator control mechanism, are provided. The vehicle further comprises a pair of electric actuators connected to the controller, each of the electric actuators being engaged to and controlling one of the pair of transaxles, and a pair of driven rear wheels located adjacent the rear of the vehicle frame and driven by one of the pair of transaxles. The vehicle further comprises a first steerable wheel disposed adjacent the front of the vehicle frame, on a first side of the vehicle frame, a front electric actuator connected to the controller and engaged to and providing a steering force for steering the first steerable wheel, and a second non-steerable caster wheel, wherein the controller controls the pair of electric actuators and the front electric actuator based on operator input to the operator control mechanism.

In a further embodiment, a vehicle comprises a pair of front wheels disposed on opposite sides of a vehicle frame adjacent a front end of the vehicle frame, wherein a first front wheel is a steerable wheel and a second front wheel is a non-steerable caster-type wheel, and an operator input control mechanism for controlling the steering, speed and direction of the vehicle. The vehicle further comprises a first gearbox disposed on the vehicle frame and linked to the operator input control mechanism, a shaft linked to the first gearbox, a second gearbox linked to the shaft, the second gearbox connected to the steerable wheel and a mechanical summator mechanically linked to the second gearbox and to the operator input control mechanism. The vehicle further comprises a pair of transaxles, each transaxle being linked to the mechanical summator through respective linkages, and a pair of driven rear wheels. The mechanical summator controls the pair of transaxles based on operator input to the operator input control mechanism, and the second gearbox steers the first wheel based on operator input to the operator input control mechanism.

A better understanding of the objects, advantages, features, properties and relationships of the inventions will be obtained from the following detailed description and accompanying drawings which set forth illustrative embodiments that are indicative of the various ways in which the principles of the inventions may be employed.

DETAILED DESCRIPTION OF THE DRAWINGS

Figure 1:
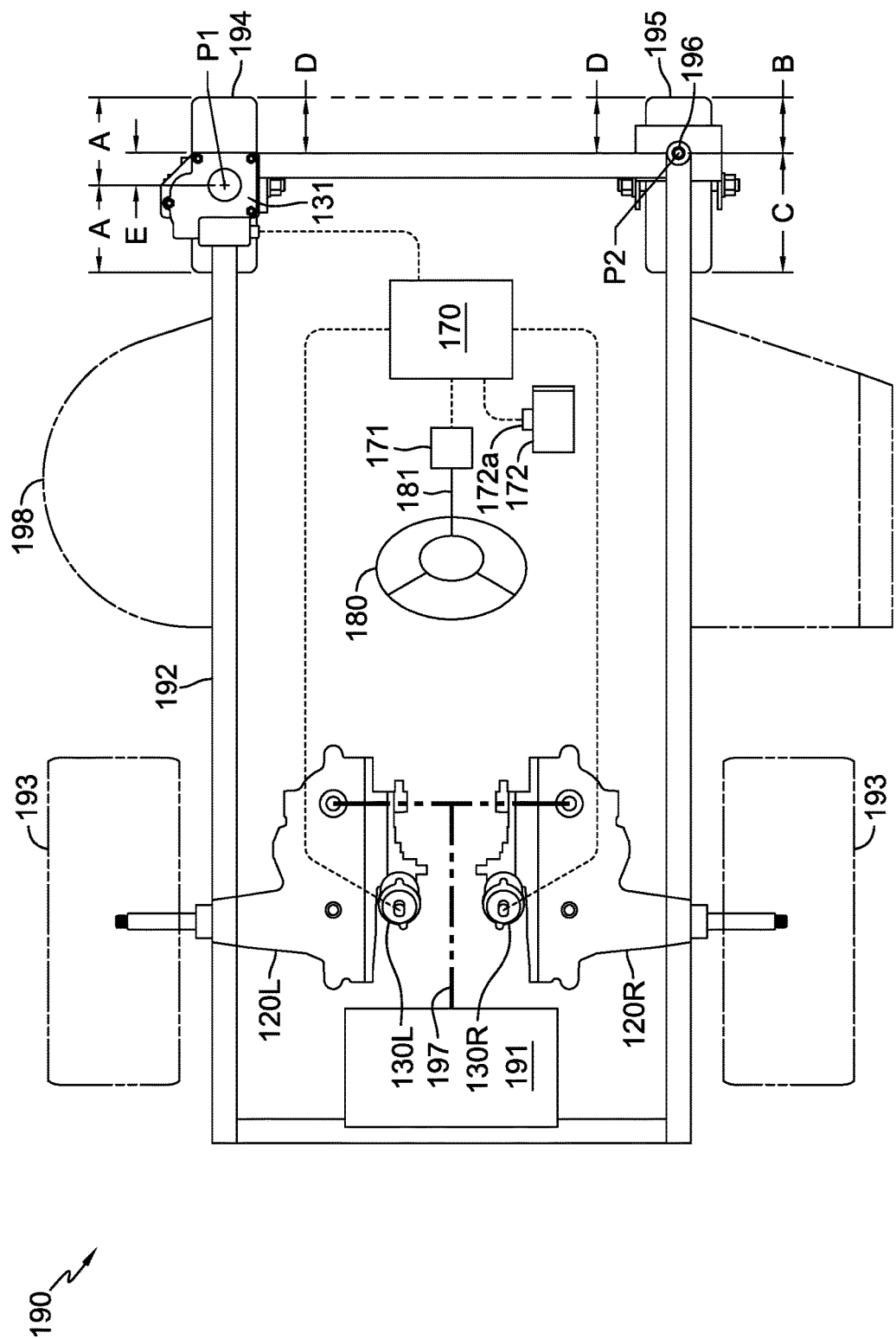
FIG. 1 is a top plan view of an exemplary zero turn vehicle having a front wheel steered with an electric actuator, and including transaxles for driving the rear wheels of the vehicle, and a steering wheel and an accelerator pedal for control of the steering, speed and direction of the vehicle.

The description that follows describes, illustrates and exemplifies one or more embodiments of the invention in accordance with its principles. This description is not provided to limit the inventions to the embodiment(s) described herein, but rather to explain and teach the principles of the inventions in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers using different prefixes in cases where such labeling facilitates a more clear description or understanding. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 depicts an embodiment of a zero turn vehicle 190 incorporating a pair of power transfer mechanisms for transferring drive power to a pair of driven wheels 193. In this particular embodiment, the power transfer mechanisms constitute transaxles 120L, 120R mounted on and supported by a frame 192. These transaxles 120L, 120R may be hydrostatic transaxles of the type shown in commonly owned U.S. Pat. No. 7,134,276, the terms of which are incorporated herein by reference. In the embodiment shown, vehicle 190 includes a deck 198, which may be of fixed height (relative to ground), ground-following, or height adjustable as known in the art. Deck 198 can include mowing blades and is intended to be representative of other ground engaging equipment such as brush cutters, aerators, and the like. Each of the transaxles 120L, 120R independently drives respective rear wheels 193 through output shafts to provide steering and drive of vehicle 190. The rear wheels 193 (and the rear wheels in the other embodiments disclosed herein) are disposed adjacent the rear of vehicle frame 192, at a distance from the rear as may be appropriate depending on the application. Prime mover 191 provides power to the transaxles 120L, 120R through a power transfer assembly, such as a belt and pulley assembly 197 (shown schematically). Prime mover 191 may be an internal combustion engine or electric motor having an electrical power source and in the embodiment depicted is disposed on vehicle frame 192 proximate to transaxles 120L, 120R.

Controller 170 can control the speed and direction of rear wheels 193 by controlling the respective transaxles 120L, 120R, based on control inputs from an operator. The operator can provide steering inputs to controller 170 through a steering wheel 180, steering column 181 and steering position sensor 171 (e.g., a potentiometer to indicate the rotational position of steering column 181). The operator can provide speed inputs (amplitude) and direction inputs (forward or reverse) to controller 170 through an accelerator pedal 172, such as a rocker-style pedal, which also incorporates a position sensor 172a, such as a potentiometer or the like.

Alternatively, in lieu of a rocker-style pedal, a conventional accelerator pedal with position sensor (not shown) and a switch (not shown) for selecting forward or reverse travel may be used. In this instance, controller 170 can be programmed to control the transition from forward to reverse travel, prevent mowing in reverse, etc. For example, the operator may be required to stop the vehicle so that both drives are in neutral for a programmed interval before switching to reverse travel. Switching to reverse travel mode can simultaneously switch off the deck 198. Additionally, an override switch may be provided so the operator must select a mow-in-reverse mode to engage the deck 198 in reverse travel mode.

Controller 170 receives and processes input signals from the accelerator position sensor 172a and the steering position sensor 171, and generates control signals (generally, an applied voltage or current) for electric actuators 130L, 130R. The electric actuators 130L, 130R are either mounted on or assembled integrally with transaxles 120L, 120R, respectively, to control the outputs thereof. A description of various control algorithms for electric actuators 130L, 130R that provide vehicle drive characteristics and safety features is detailed in commonly-owned U.S. Pat. No. 8,844,658, the terms of which are incorporated herein by reference, and shall not be further described herein. Electrical energy may be supplied to the controller 170 by an independent electrical power source, such as a battery (not shown), or an alternator or generator (not shown) associated with prime mover 191.

Controller 170 also processes input signals from the steering position sensor 171 and accelerator position sensor 172a to generate control signals for an electric actuator 131 engaged to a steered front wheel 194. As indicated by a pair of Dimensions A that are approximately equivalent, steered front wheel 194 is centered about its own pivot axis P1 to ease the steering/pivoting transition between forward and reverse. Electric actuator 131 pivots the steered front wheel 194 in conjunction with the intended travel vector of vehicle 190 as dictated by controller 170 to the transaxles 120L, 120R driving rear wheels 193. By coordinating the relative speed and direction of the rear wheels 193 (through transaxles 120L, 120R) and the steered-orientation of front wheel 194, vehicle control can be improved when travelling and/or mowing across sloped terrain, for example.

In addition to the steered front wheel 194, a non-steered caster 195 is provided for additional vehicle support and stability. Caster 195, as is typical of casters, has a pivot axis P2 that is unequally offset as measured from the front and rear of the wheel. This unequal offset is represented by Dimensions B and C. As shown, the rotational axis P2 of caster 195 can be located forward of the rotational axis P1 of steered front wheel 194, as indicated by Offset Dimension E, so the front of these two wheels are in alignment when traveling forward in a straight line as indicated by a pair of approximately equivalent Dimensions D. Caster 195 rotates to generally follow the travel vector of vehicle 190, and reacts in response to the actions of the driven rear wheels 193. A damper 196 can optionally be applied to caster 195 to dampen the pivoting motion of caster 195 so that caster 195 better tracks along the travel vector of vehicle 190. This may be particularly useful when travelling and/or mowing across sloped or uneven terrain. Damper 196 may be adjustable to compensate for wear and/or to obtain a desired amount of dampening. Damper 196 may include various configurations of springs, clamps, and/or sleeves for inhibiting and lessening the pivoting motion of caster 195.

It should be noted that caster 195 may have a tendency to scuff the ground or cause the front of vehicle 190 to shift to one side or the other when transitioning vehicle 190 from forward to reverse travel or vice versa. In order to minimize this scuffing effect, caster 195 may be designed such that Dimensions B and C are closer to equivalent than is typically found on contemporary utility vehicles having a pair of casters. Additionally, caster 195 may include a tire having less grip than a tire of the steered wheel 194. For example, the tire of caster 195 may have a slick surface or tread with less grip or a width that is narrower than that of the tire of steered wheel 194. In addition to reducing scuffing, this can also reduce stress imparted through frame 192 to the steered wheel 194 and electric actuator 131.

Figure 2:
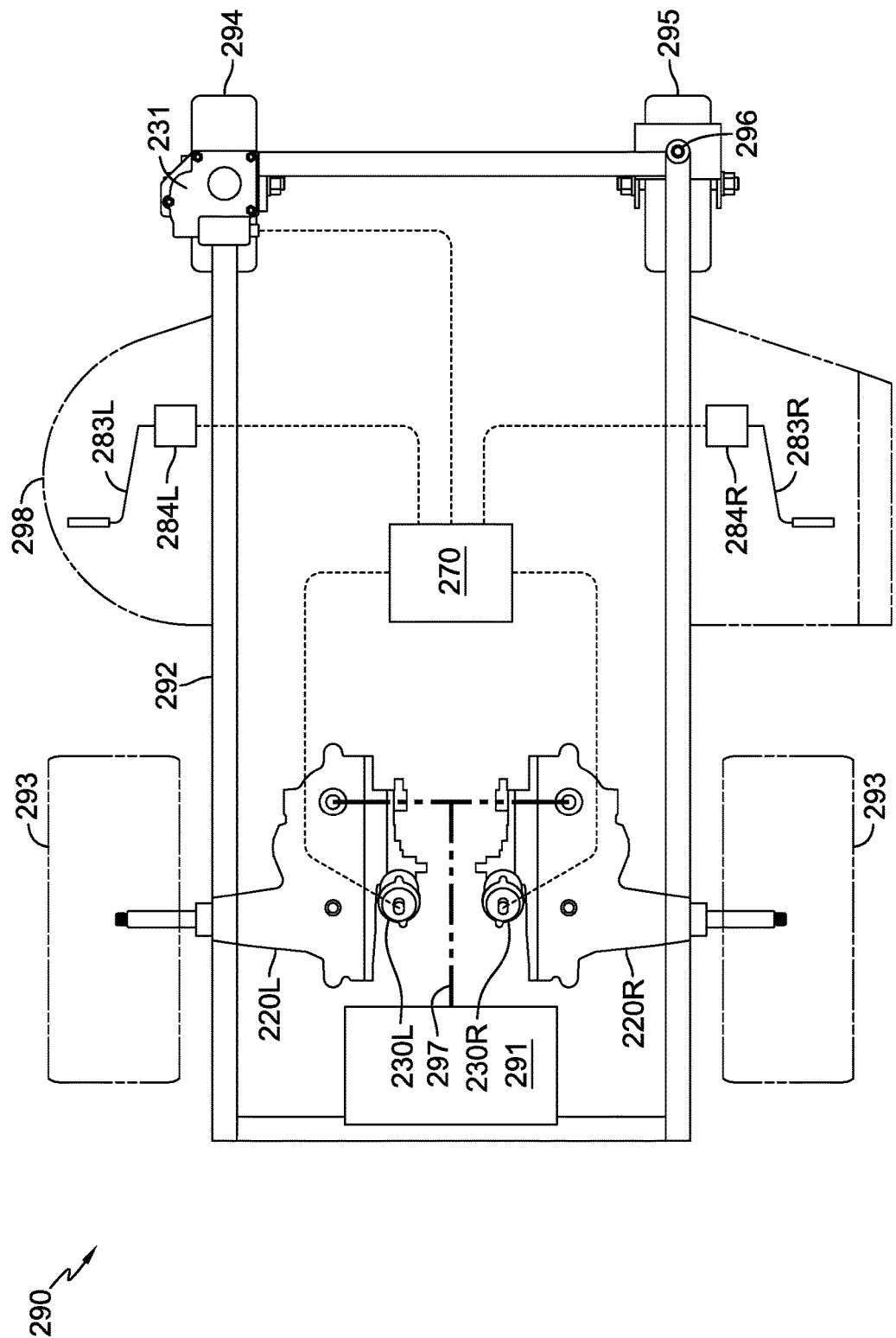
FIG. 2 is a top plan view of an exemplary zero turn vehicle similar to the vehicle of FIG. 1, but including control levers for control of the steering, speed and direction of the vehicle.

FIG. 2 depicts an embodiment of a zero turn vehicle 290 that is similar to vehicle 190, but differing in that vehicle 290 is equipped with control levers 283L, 283R having associated position sensors 284L, 284R to generate operator control inputs. The control levers 283L, 283R and position sensors 284L, 284R replace the steering wheel 180 and steering column 181, the accelerator pedal 172, and the respective position sensors 171, 172a utilized on vehicle 190. Control levers 283L, 283R can be manipulated by an operator to impart steering, speed and direction inputs to the controller 270. The control algorithms detailed in commonly owned U.S. Pat. No. 8,844,658, are also applicable to the electric actuators 230L, 230R in the vehicle drive configuration of vehicle 290, and shall not be further described herein. In addition to control levers 283L, 283R, it should be understood that other operator input devices, such as a joystick (not shown), could be used in combination with controller 270 to impart an operator's steering, speed and direction inputs to the drive system. Front wheel 294 can be steered with electric actuator 231, as in the manner described for vehicle 190. Front non-steered caster 295 rotates to generally follow the travel vector of vehicle 290, and reacts in response to the actions of the driven rear wheels 293. A damper 296 may optionally be applied to caster 295, as in the manner described for vehicle 190.

Figure 3:
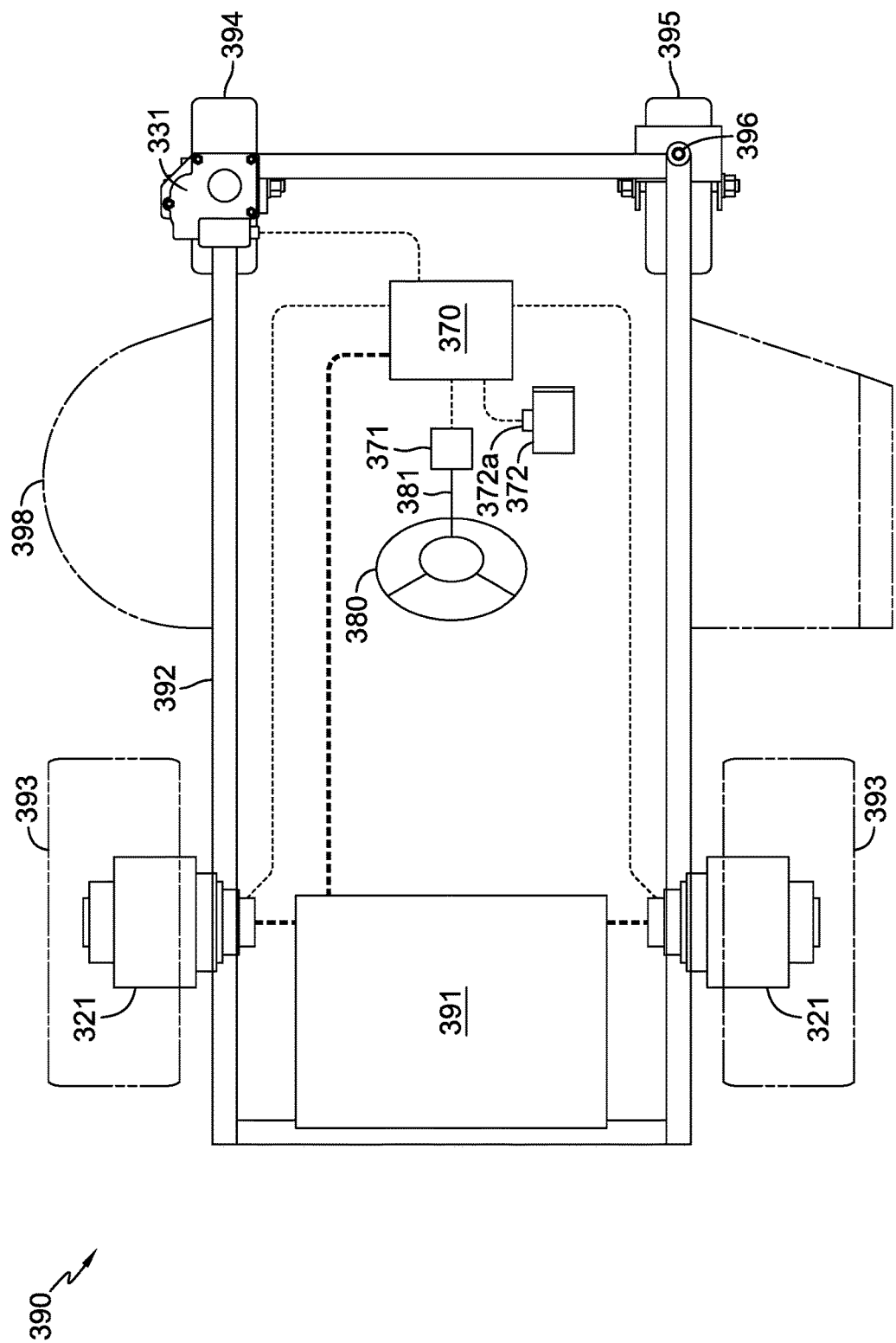
FIG. 3 is a top plan view of an exemplary zero turn vehicle similar to the vehicle of FIG. 1, but including electric hub motors for driving the rear wheels of the vehicle.

FIG. 3 depicts an embodiment of a zero turn vehicle 390 that is similar to vehicle 190, but differing in that rear wheels 393 of vehicle 390 are driven by a pair of electric hub motors 321 and an electrical power source 391. Electric power source 391 could be a battery or collection of batteries, a prime mover such as an internal combustion engine driving a generator, a combination thereof, or another source of electric power. Electric hub motors 321 are utilized in vehicle 390 as the power transfer mechanisms in lieu of the hydrostatic transaxles 120L, 120R and electric actuators 130L, 130R shown in FIG. 1 for vehicle 190. Controller 370 controls the speed and direction of electric hub motors 321 that drive rear wheels 393, based on operator input through steering wheel 380 having a steering column 381 connected to steering position sensor 371, and accelerator pedal 372 (and its associated position sensor 372a). Alternatively, electric transaxles can be used in lieu of the electric hub motors 321 shown in FIG. 3. Front wheel 394 can be steered with electric actuator 331, as in the manner described for vehicle 190. Front non-steered caster 395 rotates to generally follow the travel vector of vehicle 390, and reacts in response to the actions of the driven rear wheels 393. A damper 396 may optionally be applied to caster 395, as in the manner described for vehicle 190.

Figure 4:
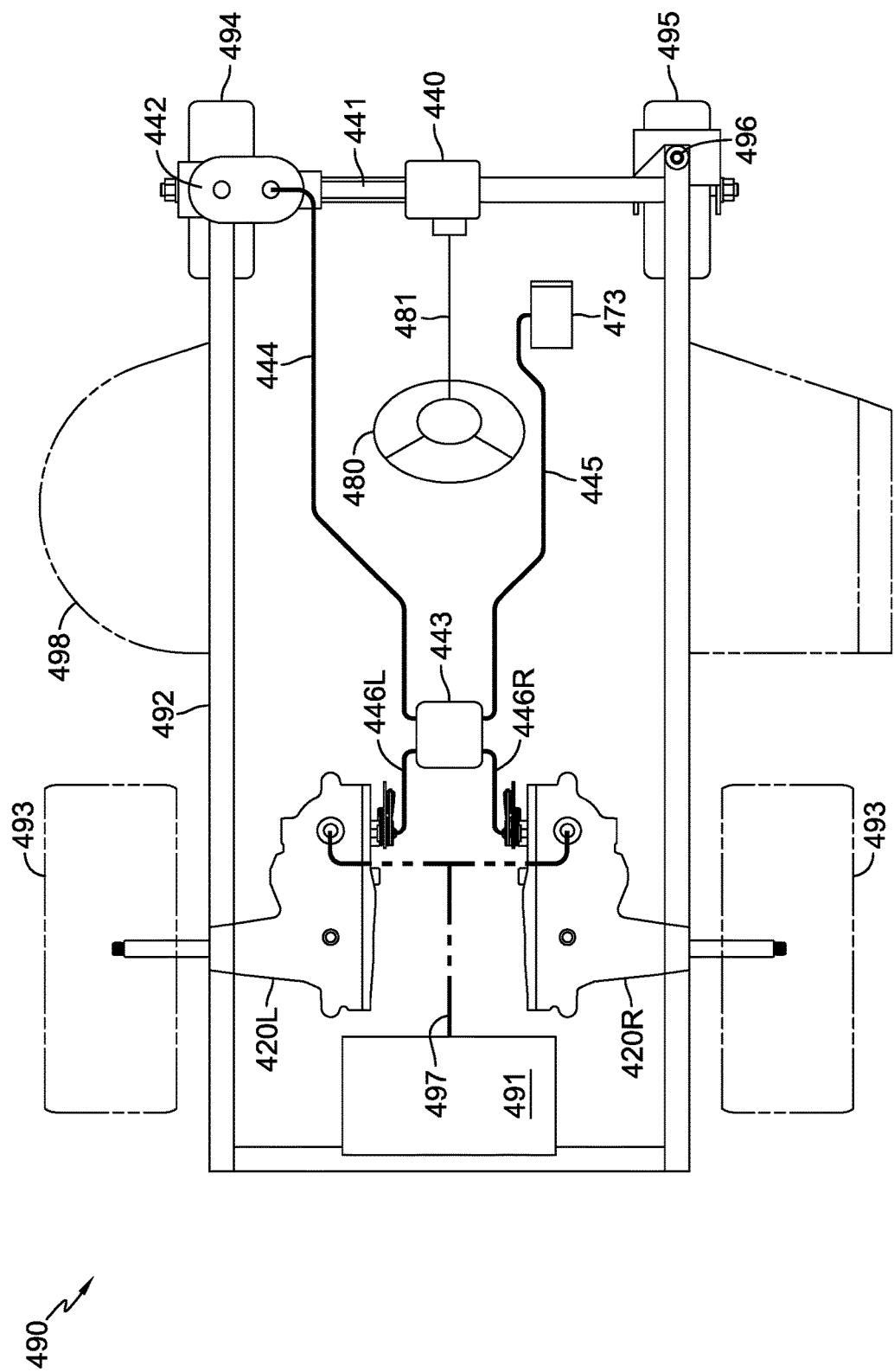
FIG. 4 is a top plan view of an exemplary zero turn vehicle with a front wheel steered through a mechanical linkage to a steering wheel of the vehicle, and including a mechanical summator to control transaxles for driving the rear wheels of the vehicle.

FIG. 4 depicts an embodiment of a zero turn vehicle 490 including a front wheel 494 steered through a mechanical linkage to steering wheel 480 and a mechanical summator 443 to control a pair of transaxles 420L, 420R. Transaxles 420L, 420R each independently drive respective rear wheels 493 through output shafts to provide steering and drive of vehicle 490. Prime mover 491 provides power to transaxles 420L, 420R through a power transfer assembly, such as a belt and pulley assembly 497 (shown schematically). Prime mover 491 may be an internal combustion engine or electric motor having an electrical power source.

An operator can provide steering input through steering wheel 480 and steering column 481 that are mechanically linked to a gearbox 440. Gearbox 440 may include an arrangement of gears, e.g., bevel gears, for linking the steering column 481 to a shaft 441 that is shown perpendicular to steering column 481. Shaft 441 may in turn be linked to a gearbox 442 that is in turn linked to the steered front wheel 494. Gearbox 442 may include an arrangement of gears, e.g., bevel gears and/or sector gears, for controlling the steered-orientation of the front wheel 494. In this way, the operator's steering input via steering wheel 480 may cause changes in the steered-orientation of the front wheel 494 through steering column 481, gearbox 440, shaft 441, and gearbox 442. In an embodiment, gearbox 442 includes a sector gear engaged to a shaft (not shown) that preferably extends below gearbox 442. This shaft engaged to the sector gear in the gearbox 442 may have an arm attached thereto that can be connected to linkage 444 so that the arm pivots to move linkage 444 when the sector gear pivots. Linkage 444, in turn, communicates the steered-orientation of front wheel 494 to mechanical summator 443. Descriptions of various arrangements and configurations of gears and shafts for linking a steering wheel and front wheels are detailed in commonly-owned U.S. Pat. No. 8,950,520, the terms of which are incorporated herein by reference.

Mechanical summator 443 can control the speed and direction of rear wheels 493 by controlling the respective transaxles 420L, 420R through output linkages 446L, 446R. In particular, mechanical summator 443 has a linkage 444 with gearbox 442 to receive steering input from steering wheel 480, and also has a linkage 445 with accelerator pedal 473 to receive speed and direction (forward or reverse) input. Mechanical summator 443 can sum the inputs received through mechanical linkages 444, 445 and appropriately control transaxles 420L, 420R through output linkages 446L, 446R. Front non-steered caster 495 rotates to generally follow the travel vector of vehicle 490, and may react in response to the actions of the driven rear wheels 493. A damper 496 may optionally be applied to caster 495, as in the manner described for vehicle 190. By coordinating the steering of the rear wheels 493 and steered front wheel 494, vehicle control can be improved when travelling and/or mowing across sloped terrain, for example.

Figure 5:
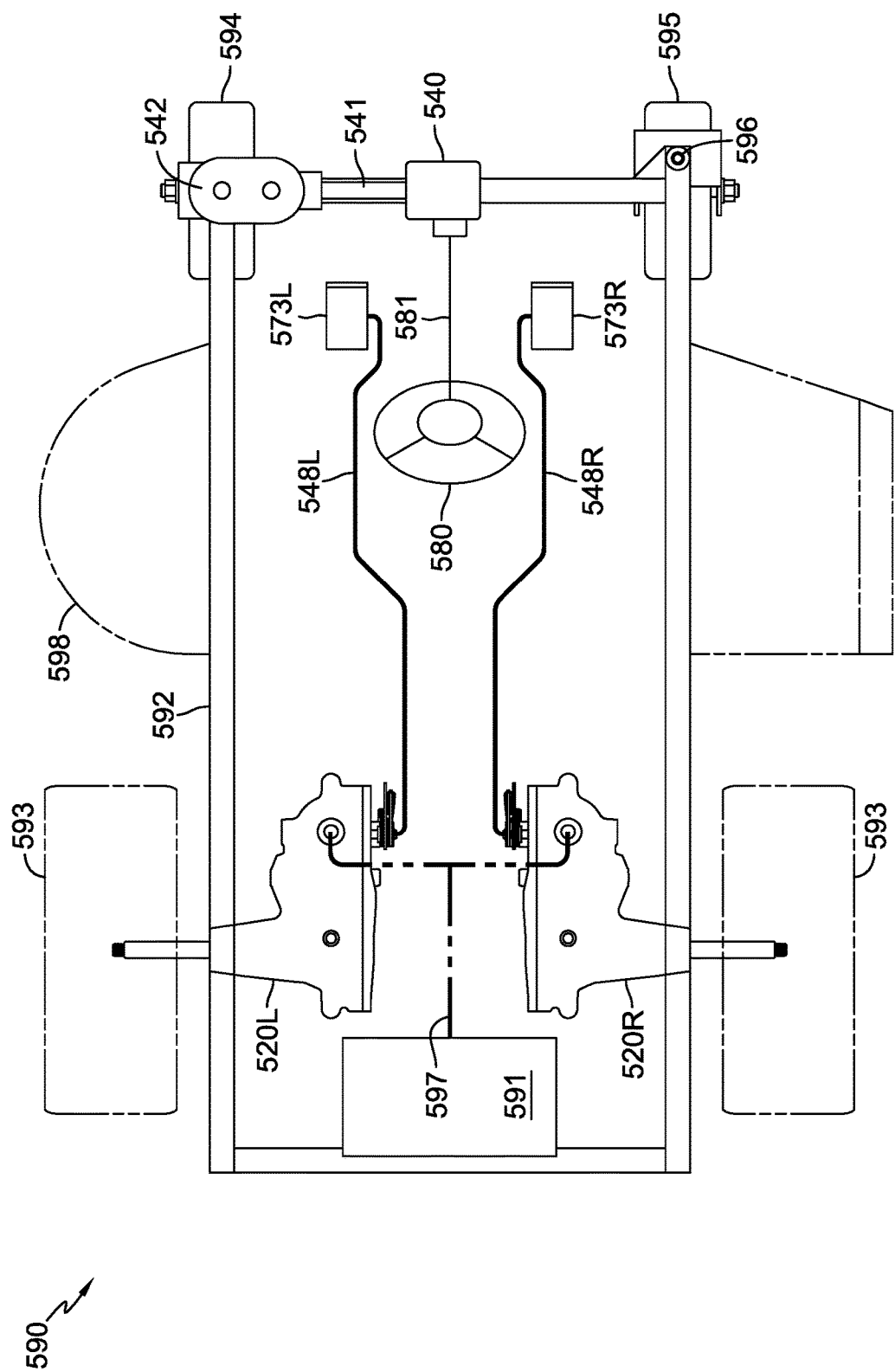
FIG. 5 is a top plan view of an exemplary zero turn vehicle similar to the vehicle of FIG. 4, but including independent pedals for allowing the operator to control transaxles for driving the rear wheels of the vehicle.

FIG. 5 depicts an embodiment of a zero turn vehicle 590 that is similar to vehicle 490, but differing in that vehicle 590 includes independent accelerator pedals 573L, 573R to control each of the transaxles 520L, 520R. Each of the pedals 573L, 573R may directly control respective transaxles 520L, 520R through linkages 548L, 548R for driving rear wheels 593 through output shafts to provide steering and drive of vehicle 590. Pedals 573L, 573R may be rocker-style pedals, for example, that can provide speed inputs (amplitude) and direction inputs (forward or reverse). In this way, the operator has direct control of the steering of front wheel 594 and of rear wheels 593, and in turn, the steering of vehicle 590. Front steered wheel 594 may be steered by steering wheel 580 through steering column 581, gearbox 540, shaft 541, and gearbox 542. Front non-steered caster 595 rotates to generally follow the travel vector of vehicle 590, and reacts in response to the actions of the driven rear wheels 593. A damper 596 may optionally be applied to caster 595, as in the manner described for vehicle 190.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:
1. A vehicle comprising:
  at least one drive mechanism disposed on a vehicle frame, the vehicle frame having a front and rear;
  an operator control mechanism for controlling the steering, speed, and direction of the vehicle;
  a pair of driven rear wheels located adjacent to the rear of the vehicle frame, wherein at least one of the pair of driven wheels is engaged to and driven by the at least one drive mechanism;
  a steered wheel disposed adjacent the front of the vehicle frame and on a first side of the vehicle frame;

a non-steered wheel located adjacent the front of the vehicle frame and on a second side of the vehicle frame opposite the first side; and a damper connected to the non-steered wheel to dampen rotation of the non-steered wheel about a non-steered wheel pivot axis.

2. The vehicle of claim 1, wherein the damper comprises an adjustable damper configured to adjust dampening of the non-steered wheel rotation about the non-steered wheel pivot axis.

3. The vehicle of claim 1, further comprising a front electric actuator engaged to and providing a steering force to the steered wheel.

4. The vehicle of claim 3, further comprising a controller in communication with the operator control mechanism, wherein the controller controls the at least one drive mechanism and the front electric actuator based on operator input to the operator control mechanism.

5. The vehicle of claim 1, wherein the at least one drive mechanism comprises a pair of drive mechanisms disposed on opposite sides of the vehicle frame, and each of the pair of driven rear wheels is engaged to and driven by one of the pair of drive mechanisms.

6. The vehicle of claim 5, wherein the pair of drive mechanisms is a pair of transaxles.

7. The vehicle of claim 6, wherein each of the pair of transaxles is a hydrostatic transaxle, and further comprising a pair of electric actuators, each of the pair of electric actuators being engaged to and controlling one of the pair of hydrostatic transaxles.

8. The vehicle of claim 7, further comprising a controller in communication with the operator control mechanism, wherein the controller controls the pair of hydrostatic transaxles based on operator input to the operator control mechanism.

9. The vehicle of claim 8, further comprising a front electric actuator engaged to and providing a steering force to the steered wheel, wherein the controller controls the front electric actuator based on operator input to the operator control mechanism.

10. The vehicle of claim 9, wherein the damper comprises an adjustable damper configured to adjust dampening of the non-steered wheel rotation about the non-steered wheel pivot axis.

11. A vehicle comprising:
a pair of transaxles disposed on a vehicle frame, the vehicle frame having a front and a rear;
an operator control mechanism for controlling the steering, speed, and direction of the vehicle, wherein the operator control mechanism includes a steering position sensor and an accelerator position sensor;
a pair of driven wheels located adjacent the rear of the vehicle frame, each rear wheel engaged to and driven by one of the pair of transaxles;
a steered wheel disposed adjacent the front of the vehicle frame, on a first side of the vehicle frame;
a front electric actuator engaged to and providing a steering force to the steered wheel;
a non-steered wheel disposed adjacent the front of the vehicle frame, on a second side of the vehicle frame opposite the first side;
a damper connected to the non-steered wheel to dampen rotation of the non-steered wheel about a non-steered wheel pivot axis; and
a controller communicably coupled to the pair of transaxles, the steering position sensor, the accelerator position sensor, and the front electric actuator, wherein the controller receives and processes input signals from the steering position sensor and the accelerator position sensor to determine an intended travel vector of the vehicle, and wherein the controller transmits control signals to the pair of transaxles and the front electric actuator based on the intended travel vector to coordinate the relative speed and direction of the pair of driven wheels and a steered-orientation of the steered front wheel.

12. The vehicle of claim 11, wherein the damper comprises an adjustable damper configured to adjust dampening of the non-steered wheel rotation about the non-steered wheel pivot axis.

13. The vehicle of claim 11, wherein each of the pair of transaxles comprises a hydrostatic transaxle.

14. The vehicle of claim 13, further comprising a pair of electric actuators, each of the pair of electric actuators being engaged to and controlling one of the pair of hydrostatic transaxles.

15. A vehicle comprising:
a pair of transaxles disposed on a vehicle frame, the vehicle frame having a front and a rear;
an operator control mechanism for controlling the steering, speed, and direction of the vehicle;
a pair of driven wheels located adjacent the rear of the vehicle frame, each rear wheel engaged to and driven by one of the pair of transaxles;
a steered wheel disposed adjacent the front of the vehicle frame, on a first side of the vehicle frame;
a non-steered wheel disposed adjacent the front of the vehicle frame, on a second side of the vehicle frame opposite the first side;
a damper connected to the non-steered wheel to dampen rotation of the non-steered wheel about a non-steered wheel pivot axis;
a first gear box disposed on the vehicle frame and connected to the operator control mechanism;
a second gear box disposed on the vehicle frame and connected to the steered wheel, the second gear box connected to the first gear box via a shaft, wherein input to the operator control mechanism changes a steered-orientation of the steered wheel via the first gear box, the shaft, and the second gear box; and
a mechanical summator connected to the second gear box and the operator control mechanism, wherein each of the pair of transaxles is linked to the mechanical summator through respective linkages, wherein the mechanical summator controls the pair of transaxles based on operator input to the operator control mechanism, and the second gear box steers the steered wheel based on operator input to the operator control mechanism.

16. The vehicle of claim 15, wherein the damper comprises an adjustable damper configured to adjust dampening of the non-steered wheel rotation about the non-steered wheel pivot axis.

17. The vehicle of claim 15, wherein the operator control mechanism comprises a steering wheel connected to the first gear box via a steering column, and wherein input to the steering wheel changes the steered-orientation of the steered wheel via the steering column, the first gear box, the shaft, and the second gear box.

* * * * *